United States Patent
Bailey et al.

(10) Patent No.: US 6,360,732 B1
(45) Date of Patent: Mar. 26, 2002

(54) EXHAUST GAS RECIRCULATION COOLING SYSTEM

(75) Inventors: Brett M. Bailey; David A. Pierpont, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/635,966

(22) Filed: Aug. 10, 2000

(51) Int. Cl.$^7$ ............... F02M 25/07; F02B 37/007
(52) U.S. Cl. ............... 123/568.12; 60/605.2; 60/612
(58) Field of Search .............. 123/568.11, 568.12; 60/605.2, 612

(56) References Cited

U.S. PATENT DOCUMENTS

| | | | | |
|---|---|---|---|---|
| 3,250,068 A | | 5/1966 | Vulliamy | |
| 4,756,285 A | * | 7/1988 | Pischinger | 60/605.2 |
| 5,142,866 A | * | 9/1992 | Yanagihara et al. | 60/605.2 |
| 5,313,798 A | * | 5/1994 | Yoshioka et al. | 60/612 |
| 5,517,976 A | | 5/1996 | Bachle et al. | |
| 5,611,202 A | * | 3/1997 | Sumser et al. | 60/605.2 |
| 6,003,315 A | * | 12/1999 | Bailey | 123/568.12 |

* cited by examiner

Primary Examiner—Willis R. Wolfe
(74) Attorney, Agent, or Firm—Keith P. Roberson

(57) ABSTRACT

A twin-turbocharged internal combustion engine improves compression efficiency and improves response by serial arrangement of a first turbocharger and a second turbocharger. An exhaust gas recirculation (EGR) system using boost cooling reduces emissions of nitrogen oxides (NOx). The EGR system cools recirculated exhaust gas by exchanging heat with compressed, cooled combustion air in an EGR heat exchanger. The second turbocharger has a variable geometry turbine to control flow of recirculated exhaust gas.

14 Claims, 2 Drawing Sheets

EXHAUST GAS RECIRCULATION COOLING SYSTEM

TECHNICAL FIELD

This invention relates generally to an internal combustion engine and specifically to an exhaust gas recirculation cooling system.

BACKGROUND ART

Most internal combustion engines are met with the challenge of increasing power, increasing efficiency, and reducing emissions. Pressure charging an internal combustion engine both increases power and increases efficiency. Pressure charging is a process in which ambient air is compressed to allow more air to fill an engine cylinder. Numerous methods of pressure charging have been used including driving a compressor off an engine shaft.

Turbochargers are a pressure charging device that further improves efficiency by using energy in an exhaust gas to provide pressure charging. High pressure, high temperature exhaust gas enter a turbine connected to a compressor. As the high pressure, high temperature exhaust gas expands through the turbine, the turbine operates the compressor. As shown in U.S. Pat. No. 3,250,068 issued to Vulliamy on May 10, 1966 shows using turbochargers arranged in a serial fashion. This arrangement allows the turbochargers to be more responsive over a larger operating range. Further, arranging turbochargers in serial fashion provides opportunities for unique controls.

To reduce emissions, an exhaust gas recirculation (EGR) system is used for controlling the generation of undesirable pollutant gases and particulate matter in the operation of internal combustion engines. Such systems have proven particularly useful in internal combustion engines used in motor vehicles. EGR systems primarily recirculate exhaust gas from combustion into the intake air supply of the internal combustion engine. Exhaust gas introduced to the engine cylinder displaces a volume available for oxygen. Reduced oxygen concentrations lower maximum combustion temperatures within the cylinder and slow chemical reactions of the combustion process, decreasing the formation of nitrous oxides (NOx). Furthermore, the exhaust gases typically contain unburned hydrocarbons which are burned on reintroduction into the engine cylinder. Burning the unburned hydrocarbons further reduces the emission of undesirable pollutants from the internal combustion engine.

In U.S. Pat. No. 5,142,866 issued to Yanagihara et al on Sep. 1, 1992, an exhaust gas recirculation system connects downstream from a first compressor in a first turbocharger. The first turbocharger connects serially with a second turbocharger. Serial turbocharging allows for more efficient compression of the intake air supply. The first turbocharger compresses a large volume of the intake air supply into a second volume. The second turbocharger is designed to compress the smaller second volume. Also, the second turbocharger is designed to respond quickly to changes in engine load.

Cooling recirculated exhaust gas further enhances emissions reductions available through recirculating exhaust gas. Cooling the exhaust gas prior to introduction into the engine cylinder further reduces the combustion temperatures in the engine cylinder. As with lower oxygen concentrations, the reduced temperature of recirculated exhaust gas ultimately lowers production of NOx in the engine cylinder.

The present invention is directed to overcoming one or more of the problems as set forth above.

DISCLOSURE OF THE INVENTION

In one aspect of the present invention an internal combustion engine has an engine block connected with a cylinder head. An exhaust manifold and intake manifold fluidly connected with the cylinder head. A first turbocharger and second turbocharger fluidly connect with the exhaust manifold. An exhaust gas recirculation conduit fluidly connects the exhaust manifold with the intake manifold. A bypass conduit fluidly connects a compressed gas conduit feeding the intake manifold with at least one turbine of the turbochargers. An exhaust gas recirculation heat exchanger thermally connects the exhaust gas recirculation conduit with said bypass conduit.

In another aspect of the present invention, a method for controlling an exhaust gas recirculation system for an internal combustion engine senses an engine operating parameter. Where the engine operating condition indicates production or likely production of NOx, flow of exhaust gas is restricted through an EGR conduit. Further, flow of combustion air through a bypass conduit is also reduced. The flow of combustion air and the flow of exhaust gas exchange heat.

BEST MODE FOR CARRYING OUT THE INVENTION

Figure 1:
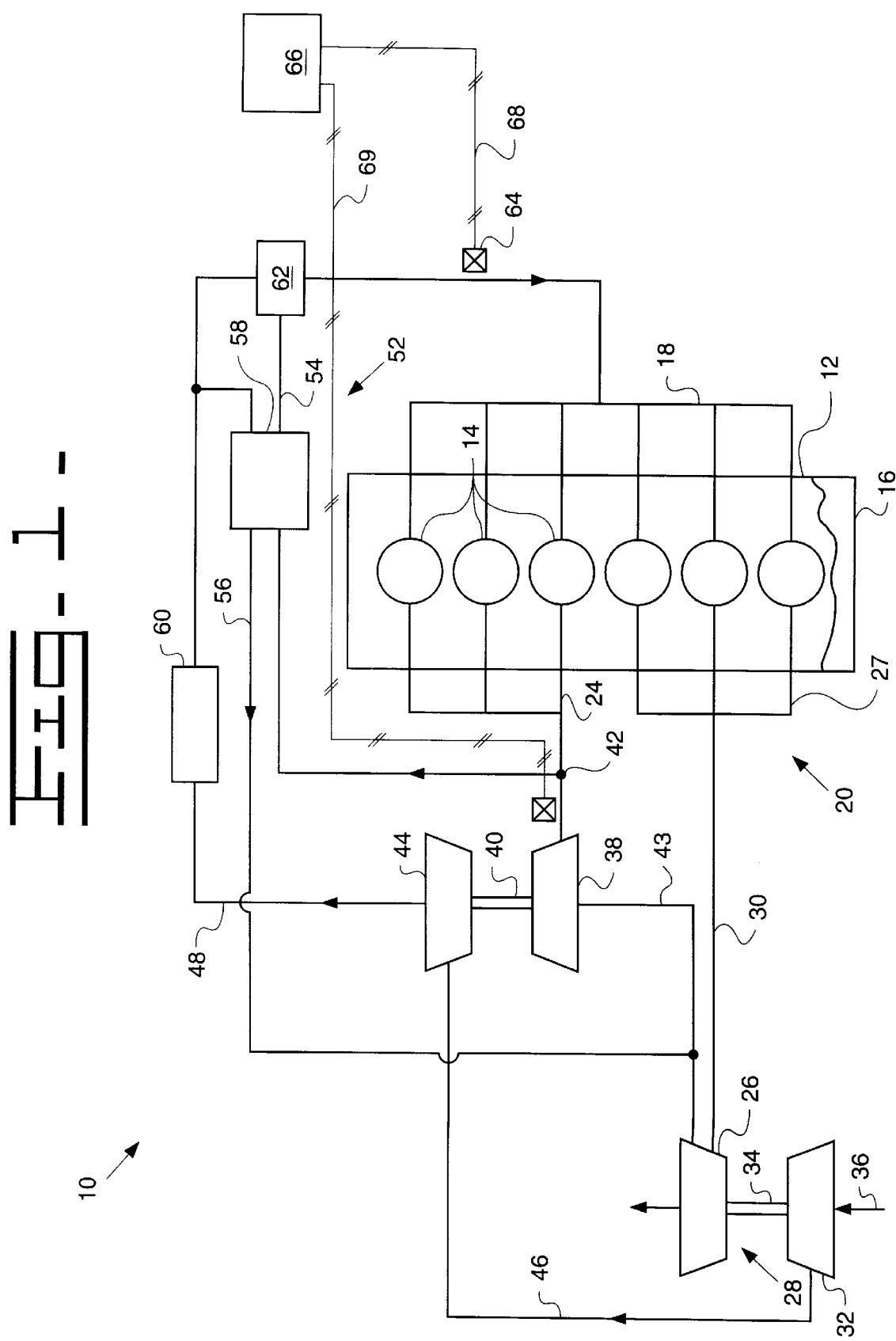
FIG. 1 is a schematic drawing of an internal combustion engine embodying the present invention.

FIG. 1 shows an internal combustion engine 10 having an engine block 12. In this application, the engine block 12 defines a plurality of engine cylinders 14. While the arrangement in FIG. 1 is that of an in-line six cylinder engine, any conventional engine arrangement may use the present invention. A cylinder head 16 attaches to the engine block 12 in a conventional manner. An intake manifold 18 fluidly connects with the cylinder head 16. An exhaust manifold 20 also fluidly connects with the cylinder head in a conventional manner. Specifically, the exhaust manifold 20 is split into a first exhaust manifold 22 and a second exhaust manifold 24. Alternatively, the exhaust manifold 20 could have multiple exhaust ports (not shown).

The first exhaust manifold 22 connects with an inlet of a first turbine 26 of a first turbocharger 28 through a first fluid conduit 30. The first turbine 26 may be of any design including variable geometry, fixed geometry, or wastegated. The first turbocharger 28 connects to a first compressor 32 through a first shaft 34. An ambient conduit 36 fluidly connects with a compressor inlet of the compressor 32.

The second exhaust manifold 24 fluidly connects with a second turbine 38 of a second turbocharger 40 through a second fluid conduit 42. In this application, the second turbocharger 40 is of a variable geometry design preferably a variable nozzle design. The second turbocharger 40 generally has a small-volume in comparison with the first turbocharger 28. An outlet of the second turbine 38 fluidly connects with the input of the first turbine 26 through a compressor exhaust conduit 43. An inlet of a second compressor 44 is fluidly connected to an outlet of the first compressor 32 through a compressed air conduit 46.

The intake manifold 18 connects with an outlet of the second compressor 44 through a compressed gas conduit 48. An aftercooler 60 connects with the compressed gas conduit 48 in a conventional manner. In this application, the aftercooler 60 is an air-to-air design. Instead of air, other cooling mediums may also be used including water and refrigerants.

An exhaust gas recirculation (EGR) system 52 includes an EGR conduit 54, a bypass conduit 56, and an EGR heat exchanger 58. The EGR conduit 54 fluidly connects the second fluid conduit 42 with the compressed gas conduit 48 downstream of the aftercooler 60. In this application, the EGR conduit 54 and compressed gas conduit 48 connect through an EGR mixer 62. Any conventional manner of combining fluid flows from two separate fluid conduits may act as the EGR mixer 62. The bypass conduit 56 connects compressor exhaust conduit 43 with the compressed gas conduit 48 downstream of the aftercooler 60. Additionally, the bypass conduit 56 connects upstream of the EGR mixer 62. The bypass conduit 56 and EGR conduit 54 connect to the EGR heat exchanger 58. The EGR heat exchanger 58 is preferably a primary surface recuperative type heat exchanger. However, the invention may use any conventional heat exchanger.

A control system includes at least an EGR sensor 64 and a controller 66. In this application, the controller 66 is a microprocessor based electronic controller. The controller 66 receives an input signal 68 from the EGR sensor 64. The EGR sensor 64 is adapted to measure an engine parameter indicative of NOx emissions such as engine load, exhaust temperature, pressure in the inlet manifold, oxygen concentration of air in the inlet manifold, or NOx concentration in the exhaust manifold. The controller sends an output signal 69 to the second turbine 38. An optional second sensor (not shown) would assist in further control of cooling recirculated exhaust gas to prevent condensation.

Figure 2:
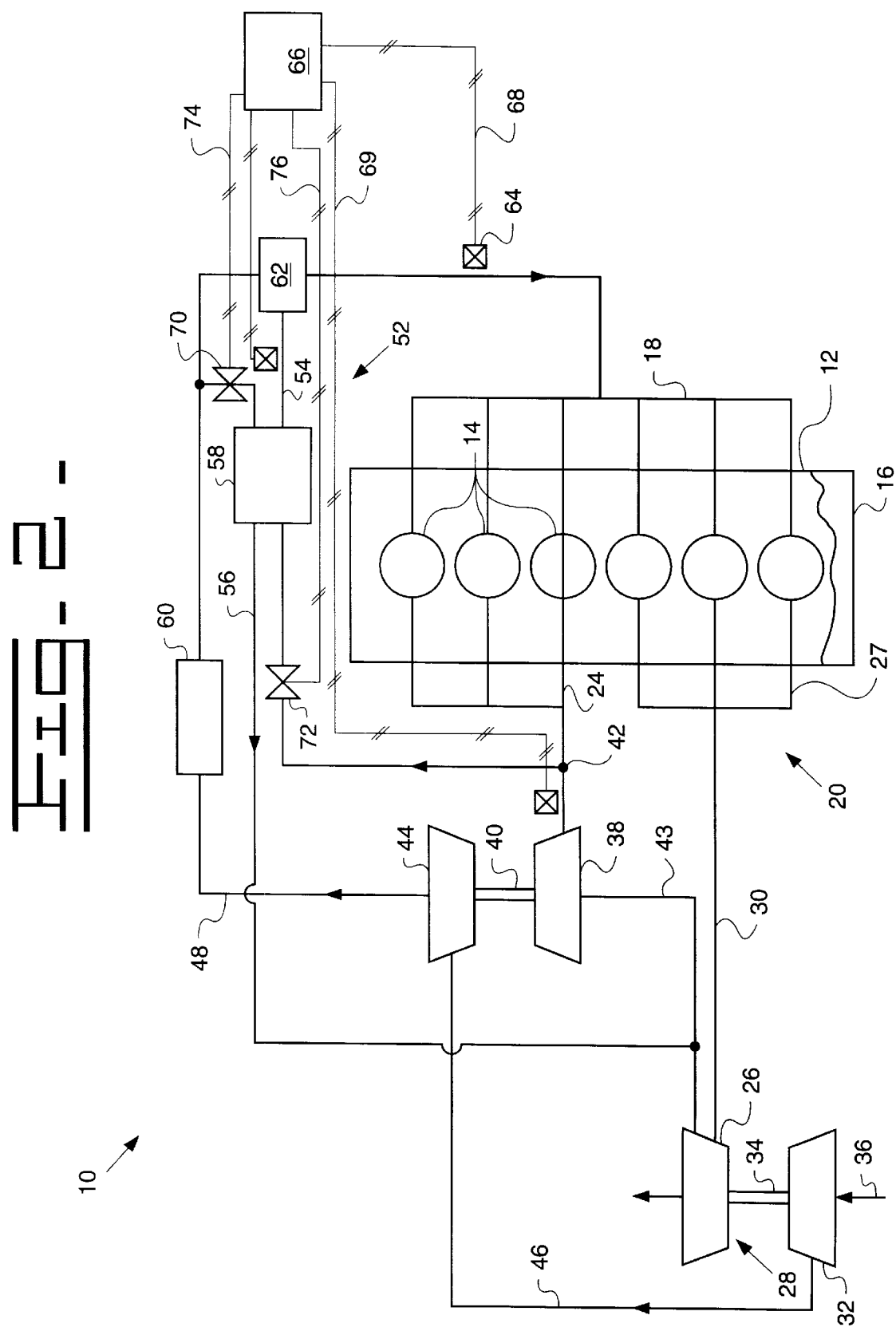
FIG. 2 shows the internal combustion engine having a boost cooling valve and an EGR valve.

FIG. 2 shows an alternative embodiment having a boost cooling valve 70 and an EGR valve 72. In this embodiment the boost cooling valve 70 is positioned in the bypass conduit 56 upstream of the EGR heat exchanger 58. The boost cooling valve 70 is preferably variably movable between a substantially open position and a substantially closed position. The EGR valve 72 is connected with the EGR conduit 54 upstream of the EGR heat exchanger 58. The EGR valve 72 operates in any conventional manner including on/off and variable operation. In this embodiment, the controller 66 also sends an output signal 74 to the boost cooling valve 70 and an output signal 76 to the EGR valve 72.

INDUSTRIAL APPLICABILITY

In operation, exhaust gas from combustion forms in the plurality of engine cylinders 14. Exhaust gas passes from the first exhaust manifold 22 through the first fluid conduit 30 into the first turbine 26. As exhaust gas expands through the first turbine 26, energy from exhaust gas drives the first shaft 34 to turn the first compressor 26.

Also, exhaust gas exits through the second exhaust manifold 24 into the second fluid conduit 42. varying the geometry of the second turbine 38 diverts a portion of the exhaust gas into the EGR conduit 54. As the second turbine 38 becomes less restrictive, the portion of exhaust gas entering the EGR conduit 54 decreases.

Combustion air passes through the first compressor 32. Combustion air then passes through the second compressor 44 where it is further compressed. Generally, the first compressor 32 imparts a greater pressure increase of combustion air than the second compressor 44. However, combustion air leaving the second compressor 44 is at higher absolute pressures than combustion air exiting the first compressor 26. After passing through the second compressor 44, the aftercooler 60 reduces temperature of combustion air. Reducing combustion air temperature further increases density of combustion air.

After passing through the aftercooler, cooled, compressed combustion air pass through either the bypass conduit 56, continue through the compressed gas conduit 48, or a portion passing through both the compressed gas conduit 48 and the bypass conduit 56. Combustion air flowing through the compressed gas conduit 48 mixes with recirculated exhaust gas in the EGR mixer 62 to form combustion gas. Combustion air flowing through bypass conduit 56 exchanges heat with the recirculated exhaust gas in the EGR conduit 54. In this application, the recirculated exhaust gas and the combustion air flowing through the bypass conduit 56 flow counter to one another. Some energy in combustion air flowing through the bypass conduit 54 is recovered during its expansion through the second turbine 38.

In FIG. 1, the EGR sensor 64 sends input signals 68 to the controller 66 to make the second turbine have more restrictive flow as the EGR sensor 64 becomes more indicative of increased NOx emission. As an example, the EGR sensor 64 may sense air pressure in the inlet manifold 18. As air pressure increases, the controller 66 interprets the input signal 68 as more indicative of increased emissions. The controller 66 sends output signals 69 to the second turbine 38 to further restrict flow in turn increasing the exhaust gas recirculating through the EGR conduit 54.

In the embodiment of FIG. 2, further control of recirculated exhaust gas is provided through the use of the boost cooling valve 70 and the EGR valve 72. In this embodiment, the boost cooling valve 70 receives the output signal 74 from the controller 60 to vary valve positions between the open position and the closed position. Where the controller 66 receives input signals 68 from the EGR sensor 64 indicative of increasing NOx production, the controller 66 sends output signals 74,76 to move the boost cooling valve 70 and EGR valve towards their respective open positions.

Other aspects, objects, and advantages of this invention can be obtained from a study of the drawings, the disclosure, and the appended claims.

We claim:

1. An internal combustion engine comprising:
   an engine block;
   a cylinder head connected with said engine block;
   an exhaust manifold fluidly connected with said cylinder head;
   an inlet manifold fluidly connected with said cylinder head;
   a first turbocharger having a first turbine and a first compressor, an inlet portion of said first turbine being fluidly connected with said exhaust manifold through a first fluid conduit;
   a second turbocharger having a second turbine and a second compressor, an inlet portion of said second turbine being fluidly connected with said exhaust manifold through a second fluid conduit, an outlet portion of said first compressor being fluidly connected with an inlet portion of said second compressor; an outlet portion of said second compressor being connected with said intake manifold through a compressed gas conduit;
   an exhaust gas recirculation conduit fluidly connecting said second fluid conduit with said intake manifold;
   a bypass conduit fluidly connecting said compressed gas conduit with the inlet portion of said first turbine; and an exhaust gas recirculation heat exchanger being adapted to thermally connect said exhaust gas recirculation conduit with said bypass conduit.

2. The internal combustion engine as specified in claim 1 wherein the outlet portion of said second turbine is fluidly connected with an inlet portion of said first turbine.

3. The internal combustion engine as specified in claim 1 wherein at least one of said second turbine and said first turbine is a variable geometry turbine.

4. The internal combustion engine as specified in claim 1 further comprising an aftercooler connected with the compressed gas conduit downstream of the outlet portion of said second compressor.

5. The internal combustion engine as specified in claim 1 further comprising a boost cooling valve connected with said bypass conduit, said boost cooling valve being moveable between an open position and a closed position, said closed position substantially inhibiting fluid communication between said compressed gas conduit and said first turbine, said open position substantially permitting fluid communication between said compressed gas conduit and said first turbine.

6. The internal combustion engine as specified in claim 5 wherein said boost cooling valve is upstream of said exhaust gas recirculation heat exchanger.

7. The internal combustion engine as specified in claim 5 wherein said boost cooling valve is variably movable between said open position and said closed position.

8. The internal combustion engine as specified in claim 1 further comprising a mixer connecting said compressed gas conduit and said second fluid conduit.

9. The internal combustion engine as specified in claim 1 further comprising an EGR valve positioned in the EGR conduit, said EGR valve having an open position and closed position, wherein said closed position exhaust gas is substantially inhibited from passing between said exhaust manifold and said inlet manifold through said EGR conduit.

10. The internal combustion engine as specified in claim 9 wherein said EGR valve is variably movable between the open position and the closed position.

11. A method of controlling an exhaust gas recirculation system for an internal combustion engine comprising the steps:

sensing an engine operating parameter;

reducing restrictions to a flow of exhaust gas through an EGR conduit wherein said engine operating parameter indicates production of NOx;

reducing restrictions to a flow of combustion air through a bypass conduit wherein said engine operating parameter indicates production of NOx; and exchanging heat between said flow of combustion air and said flow of exhaust gas.

12. The method as specified in claim 11 wherein said sensing is a pressure sensor positioned in an intake manifold, said pressure sensor is adapted to measure an air pressure of a combustion gas.

13. The method as specified in claim 11 wherein said reducing step is controlling a variable geometry turbine of a turbocharger.

14. The methods as specified in claim 11 wherein said reducing step is an EGR valve in said EGR conduit.

* * * * *